(12) United States Patent
Kunc et al.

(10) Patent No.: US 8,305,137 B2
(45) Date of Patent: Nov. 6, 2012

(54) ISOLATING INTERFACE WITH A DIFFERENTIATING CIRCUIT COMPRISING A CAPACITIVE BARRIER AND METHOD FOR TRANSMITTING A SIGNAL BY MEANS OF SUCH ISOLATING INTERFACE

(76) Inventors: Vinko Kunc, Ljubljana (SI); Andrei Yodopivec, Ljubljana (SI)

( * ) Notice: Subject to any disclaimer, the term of this patent is extended or adjusted under 35 U.S.C. 154(b) by 316 days.

(21) Appl. No.: 12/452,229

(22) PCT Filed: Jun. 20, 2008

(86) PCT No.: PCT/SI2008/000039
§ 371 (c)(1),
(2), (4) Date: Mar. 19, 2010

(87) PCT Pub. No.: WO2008/156432
PCT Pub. Date: Dec. 24, 2008

(65) Prior Publication Data
US 2010/0315182 A1    Dec. 16, 2010

(30) Foreign Application Priority Data
Jun. 21, 2007    (SI) ................................. 200700146

(51) Int. Cl.
*G06G 7/12* (2006.01)
(52) U.S. Cl. .............................................. 327/560
(58) Field of Classification Search .................. None
See application file for complete search history.

(56) References Cited

U.S. PATENT DOCUMENTS

| 6,819,169 B1 * | 11/2004 | Kunc et al. | 327/560 |
| 7,050,388 B2 * | 5/2006 | Kim et al. | 370/201 |
| 2004/0213354 A1 * | 10/2004 | Jones et al. | 375/285 |

FOREIGN PATENT DOCUMENTS

| EP | 0744750 A2 | 11/1996 |
| EP | 1582039 A1 | 5/2005 |
| SI | 21435 A | 8/2004 |
| WO | WO 2004/062221 A | 7/2004 |
| WO | WO 2006/045148 A2 | 5/2006 |
| WO | WO 2006/110849 A2 | 10/2006 |

* cited by examiner

*Primary Examiner* — Lincoln Donovan
*Assistant Examiner* — Khareem E Almo
(74) *Attorney, Agent, or Firm* — Jacobson Holman PLLC

(57) ABSTRACT

A known method for parallel two-way symmetrical signal transmission by means of an isolating interface with a differentiating circuit comprising a capacitive barrier is improved. When restarting communication in the selected direction after a longer break, a pilot signal is conducted via the transmitting plates for the communication in the reverse direction and capacitive compensators to one of the receiving plates for communication in the selected direction. Threshold levels for comparisons of the signals of the first and second time derivative are decreased, the capacitance of capacitive compensators is then set to reduce output the output signal and finally communication is reestablished. Transmitting plates for communication in the reverse direction are now connected to the receiving plates for communication in the selected direction through the capacitive compensators with the capacitance adjusted as described above. This provides satisfactory signal transmission even when a thick layer of an electrically well conductive liquid appears between the plates of the isolating interface.

10 Claims, 4 Drawing Sheets

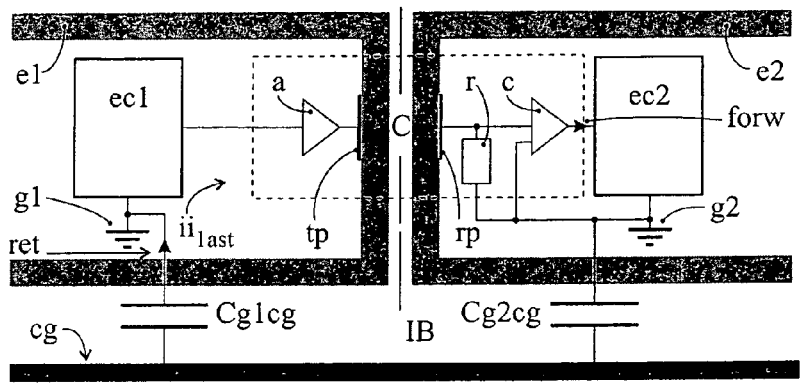
Fig. 6a
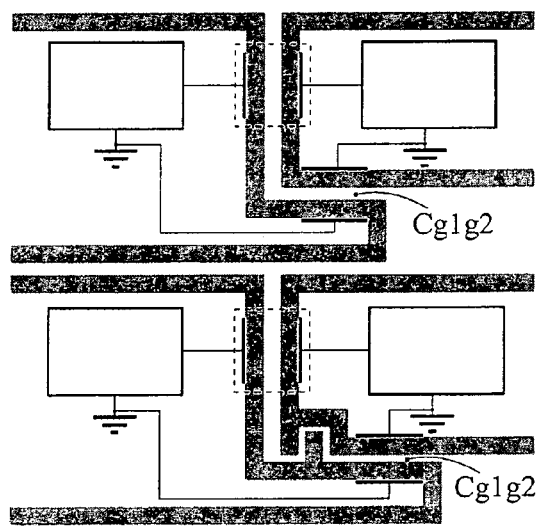
Fig. 6b
Fig. 6c
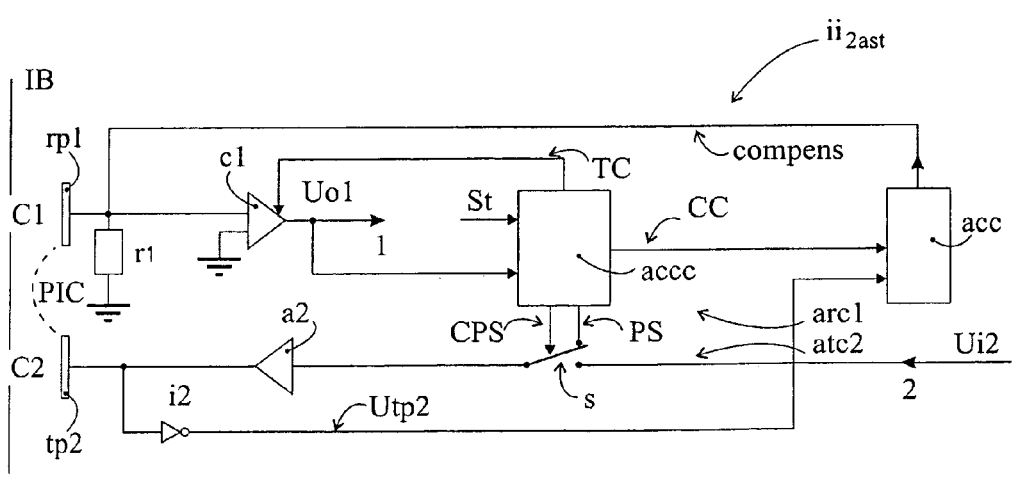
Fig. 7

US 8,305,137 B2

ISOLATING INTERFACE WITH A DIFFERENTIATING CIRCUIT COMPRISING A CAPACITIVE BARRIER AND METHOD FOR TRANSMITTING A SIGNAL BY MEANS OF SUCH ISOLATING INTERFACE

This is a national stage of PCT/SI08/000039 filed Jun. 20, 2008 and published in English, which has a priority of Slovenia no. P-200700146 filed Jun. 21, 2007, hereby incorporated by reference.

The invention relates to an isolating interface with a differentiating circuit comprising a capacitive barrier and a method for a signal transmission by means of such isolating interface in most demanding conditions, like in the case of penetration of an electrically conductive liquid inbetween the plates of the isolating interface.

An isolating interface with a capacitive barrier is often used for a contactless signal transmission. Known isolating interfaces of this kind operate in a satisfactory manner in an environment, in which parasitic capacitances and especially parasitic conductivities are low.

Figure 1:
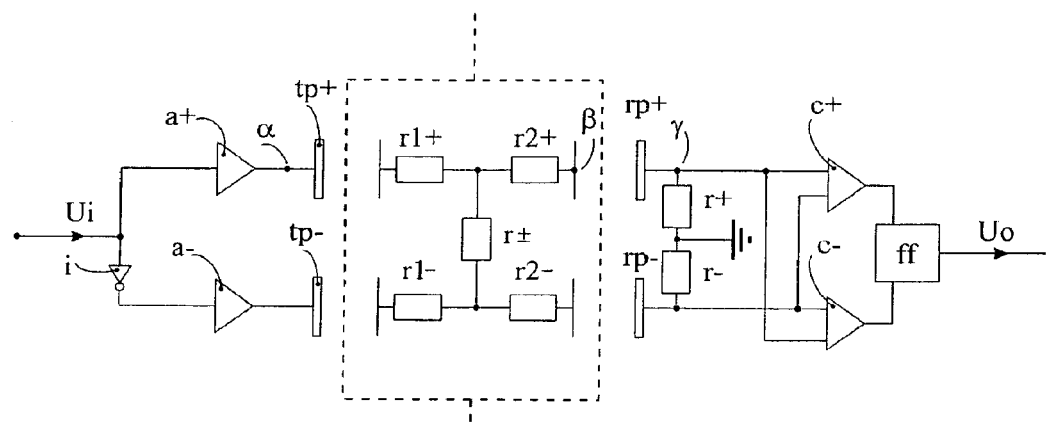

A known isolating interface $ii'_{1sst}$ with a capacitive barrier for a one-way symmetrical signal transmission by means of signal replicas being in mutual phase opposition in two parallel paths is represented in FIG. 1 (EP 0 744 750 and WO/2006/045148). The isolating interface $ii'_{1sst}$ comprises a transmitting circuit, into which an input signal Ui enters and which is comprised of an invertor i, amplifiers a+, a− and transmitting plates tp+, tp−, and a receiving circuit, which is comprised of receiving plates rp+, rp−, resistors r+, r−, comparators c+, c− and a flipflop ff, from which an output signal Uo emerges. Between the transmitting plates tp+, tp− in the first and second path and the receiving plates rp+, rp− in the first and second path, respectively, there exists an interface boundary IB acting as a capacitive barrier. If an electrically conductive liquid penetrated inbetween the interface plates, the situation on the interface boundary IB may be represented by an equivalent circuit in FIG. 1 by means of parasitic resistances r1+, r2+, r1−, r2− and r±. The signal level is reduced from its level existing on the transmitting plates tp+, tp− by a voltage divider being represented by the parasitic resistances r1+, r2+, r1−, r2− and r±. Therefore, the distance between two transmitting plates and two receiving plates, at which the functioning of the isolating interface is satisfactory, is drastically decreased. Additionally, the parasitic resistance r± between two paths for the signal replicas being in mutual phase opposition shortens the duration of pulses in the communication signal, as well, because the fall rate of the potential difference between both paths depends mainly on the sum of all capacitances between said plates and on the parasitic resistance r± between two paths. Such pulse form, however, especially disables an effective rejection of disturbances resulting from variations of potential difference between supply voltages of the transmitting and receiving electronic circuits. Till recently, this used to be an even more considerable and usually an unsolvable difficulty in the transmission of the communication signal through a nonideal capacitive barrier.

In their patent SI 200300001 (WO 2004/062221, EP 1 582 039 A1, US 6,819,169), the authors and applicants of the present technical solution suggested a technical solution to a reliable signal transmission in complicated conditions, such as presence of an electrically conductive liquid between the plates of an isolating interface. They proposed the isolating interface $ii'_{1sst}$ with a capacitive barrier for a one-way symmetrical signal transmission as represented in FIG. 1 wherein the capacitive barrier is part of a differentiating circuit in a receiving circuit of the interface in either path of two signal replicas being in mutual phase opposition. Namely, they required that the time constant of either said differentiating circuit should be smaller than a rise time and a fall time of said signal replicas. A level decrease in the signal in point p on either path due to the parasitic conductivities does not cause a proportional signal decrease in the point γ, on the contrary, the signal level at the input of comparators c+ and c− depends on the rate of variations of the input signal Ui.

Figure 3A:
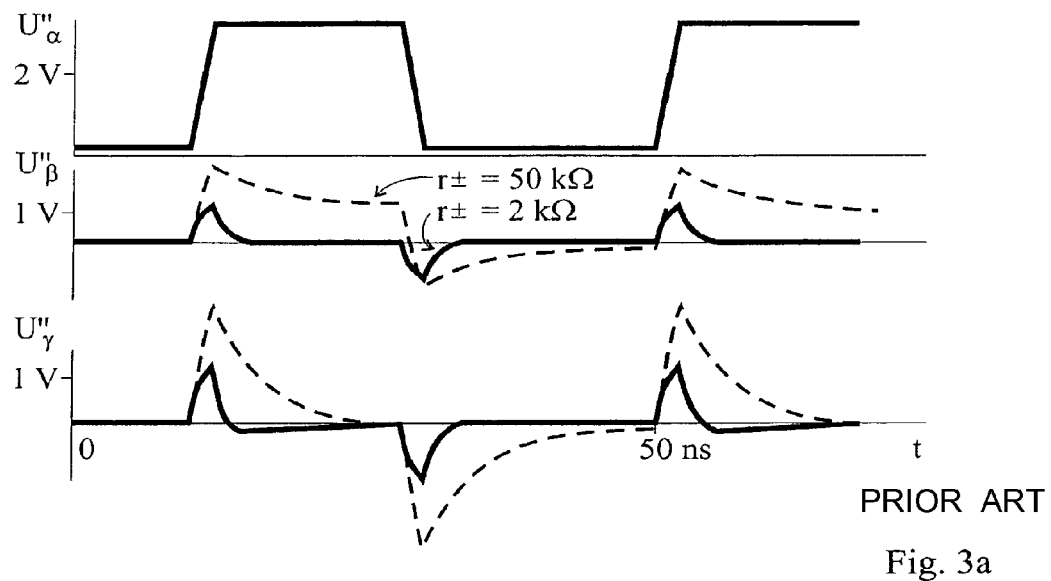
Figure 3B:
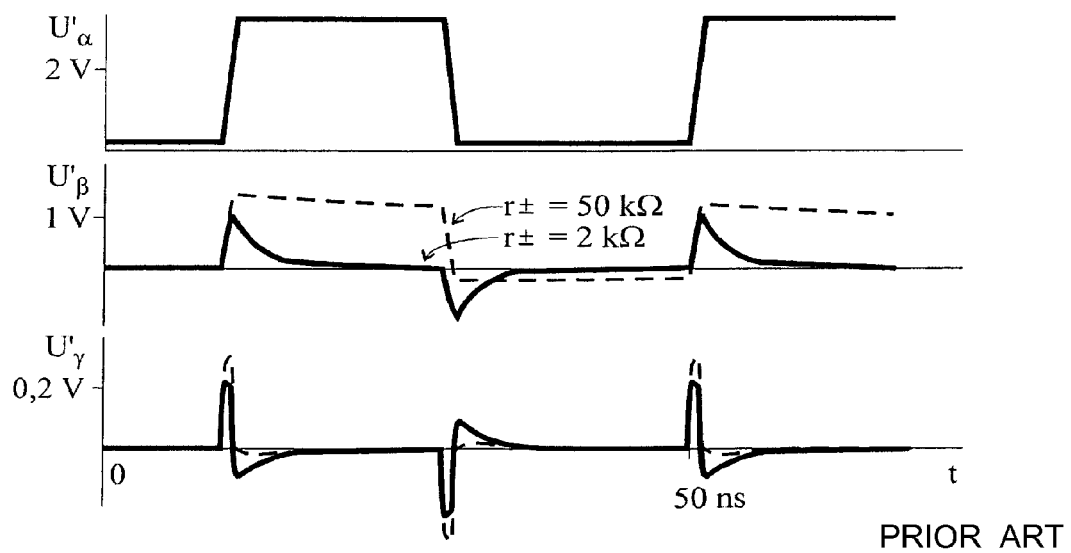

Whether a shorter pulse duration due to the parasitic conductivities will impair the efficiency of the isolating interface in FIG. 1 largely depends on the value of the time constant of the controlled shortening of the pulse at the input of the comparators c+ and c−, i.e. on the resistances of the resistors r+ and r− with respect to the value of time constant of the controlled pulse shortening due to the parasitic resistance r±. Simulations of pulse time behaviour in points α, β and γ in the known isolating interface $ii'_{1sst}$ as represented in FIG. 1 with resistances r+=r−=10 kΩ are represented in FIG. 3a, and simulations of the pulse time behaviour in the same points in the isolating interface $ii'_{1sst}$ from FIG. 1 with resistances r+=r−=100 kΩ, i.e. according to the patent SI 200300001, are represented in FIG. 3b, each time for the parasitic resistances r±=50 kΩ (dashed) and r±=2 kΩ (full line) at the capacitance of 0.5 pF between the plates tp+ and rp+ as well tp− and rp−. The known isolating interface $ii'_{1sst}$ as represented in FIG. 1 with the resistance r+=r−=10 kΩ functions adequately only at low parasitic conductance, whereas the signal at the input of the comparators c+ and c− is too low at high parasitic conductance, this means, when an electrically conductive liquid has penetrated between the interface plates. The known isolating interface $ii'_{1sst}$ from FIG. 1 according to the patent SI 200300001 functions at high parasitic conductance $(r±)^{-1}$ as well. It distinguishes itself in that it can operate also in a very adverse environment.

The isolating interface $ii'_{2sst}$ with the capacitive barrier for the parallel two-way symmetrical signal transmission by means of the signal replicas being in mutual phase opposition in two parallel paths in either direction 1 and 2 (FIG. 2) is a further development of the isolating interface $ii'_{1sst}$ according to the patent SI 200300001. Said isolating interface $ii'_{1sst}$ comprises a first transmitting circuit tc1' and a first receiving circuit rc1' for the first communication direction 1 and a second transmitting circuit tc2' and a second receiving circuit rc2' for the second communication direction 2. The first transmitting circuit tc1' and the first receiving circuit rc1' on the one and another side of the interface boundary IB for the first communication direction 1 are electrically coupled to each other due to the capacitances C+1; C−1 between pairs of their transmitting and receiving plates tp+1, rp+1; tp−1, rp−1; in the same way the second transmitting circuit tc2' and the other receiving circuit rc2' for the second communication direction 2 are electrically mutually coupled due to the capacitances C+2; C−2 between pairs of their transmitting and receiving plates tp+2, rp+2; tp−2, rp−2. Furthermore, the first receiving circuit rc1' for the first communication direction 1 in both paths, situated symmetrically with respect to the ground potential, is provided with a first differentiating circuit r+1, C+1 and a second differentiating circuit r−1, C−1, respectively, which are made of a resistor r+1; r−1 and the capacitance C+1; C−1 existing each time between one transmitting plate and the receiving plate rp+1; rp−1 pertinent thereto at the capacitive barrier and with a first comparator c+1 and a second comparator c−1, which are connected to said first differentiating circuit and the second differentiating circuit, respectively.

When partial capacitances PIC between the plates situated on the same side of the interface boundary IB grow high enough due to electrically conductive impurities between the interface plates, the coupling PIC of the second transmitting circuit tc2 for the second communication direction 2 with the first receiving circuit rc1 for the first communication direction 1 sufficiently intensifies for a variation of the potential on the plates tp+2, tp−2 as a consequence of a parallelly transmitted signal Ui2 in the second communication direction 2 to produce a pulse high enough on the receiving plates rp+2, rp−2 so that the comparators c+1 and c−1 switch over due to these pulses. Yet this means an error in the signal received by the first receiving circuit rc1 for the communication in the first direction 1. Such error results from a crosstalk between the second transmitting plates tp+2, tp−2 and the first receiving plates rp+1, rp−1 if a discussion is limited just to the consideration of the received output signal Uo 1 in the parallel transmission in the first communication direction 1. Said crosstalk can be done away within predictable situations by minimizing parasitic partial capacitances between the plates. In the differential isolating interface it can be achieved by an appropriate mutual arrangement of interface plates. However, an electrically conductive liquid can reach the interface plates in an unpredictable way. The parasitic capacitances then change in time and may also emerge where they were not present before. A disadvantage of the isolating interface $ii'_{2sst}$ with the differentiating circuit comprising the capacitive barrier for the parallel two-way symmetrical signal transmission exists in that communication herewith is disturbed due to crosstalks in situations of high parasitic conductivities.

Difficulties in communication also arise in an isolating interface $ii'_{1sst}$ according to the patent SI 200300001 with the differentiating circuit comprising the capacitive barrier for symmetrical signal transmission by means of two signal replicas being in mutual phase opposition in two parallel paths whenever it must operate in extremely demanding situations when a thick layer of an electrically well conductive liquid appears between the plates of the isolating interface.

The invention is based on the technical problem as how to improve said isolating interface with the differentiating circuit comprising the capacitive barrier for the parallel two-way communication as well as one-way communication, in order to make it adequate to operate in difficult conditions when a thick layer of an electrically well conductive liquid appears between the plates of the isolating interface and to propose a method for signal transmission by means of an improved isolating interface with the differentiating circuit comprising the capacitive barrier.

The set problem is managed by embodiments of the invention of an isolating interface and a method.

An outstanding advantage of the isolating interface and the method of the invention lies in that a satisfactory signal transmission is achieved even when a thick layer of an electrically well conductive liquid appears between the plates of the isolating interface.

Figure 4:
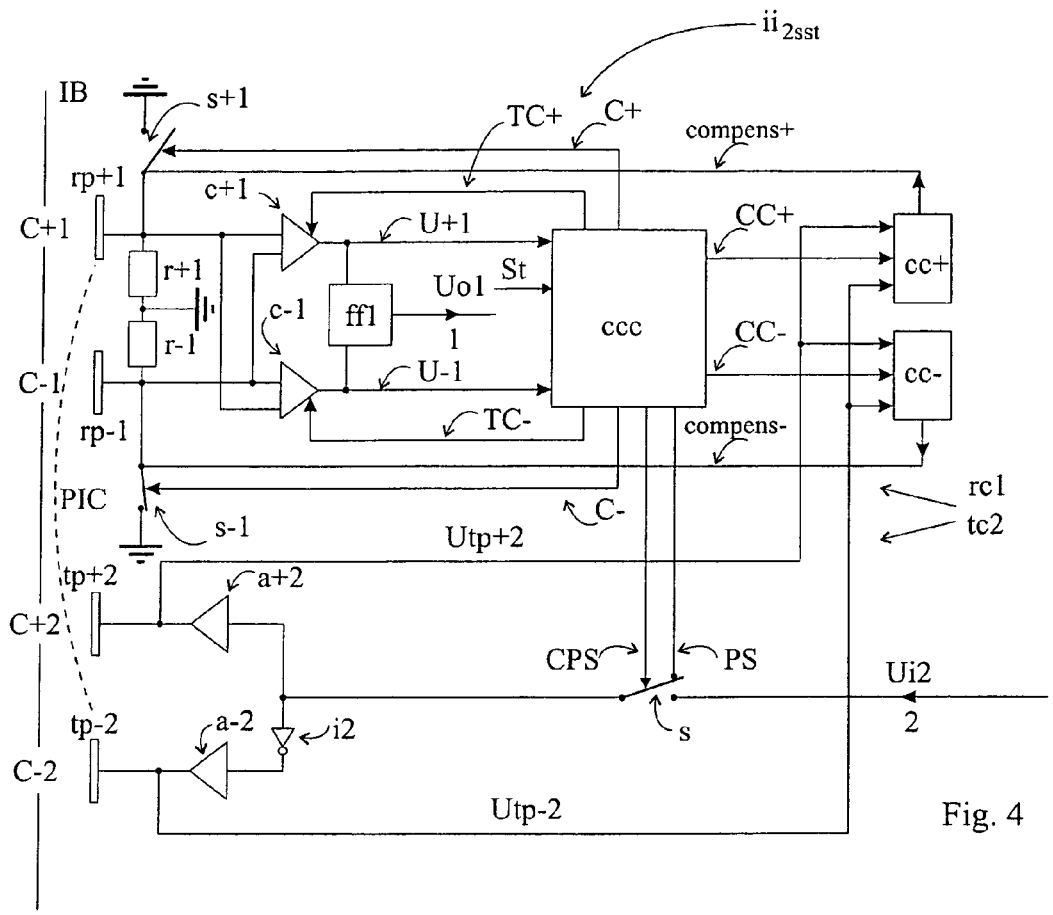
Figure 5:
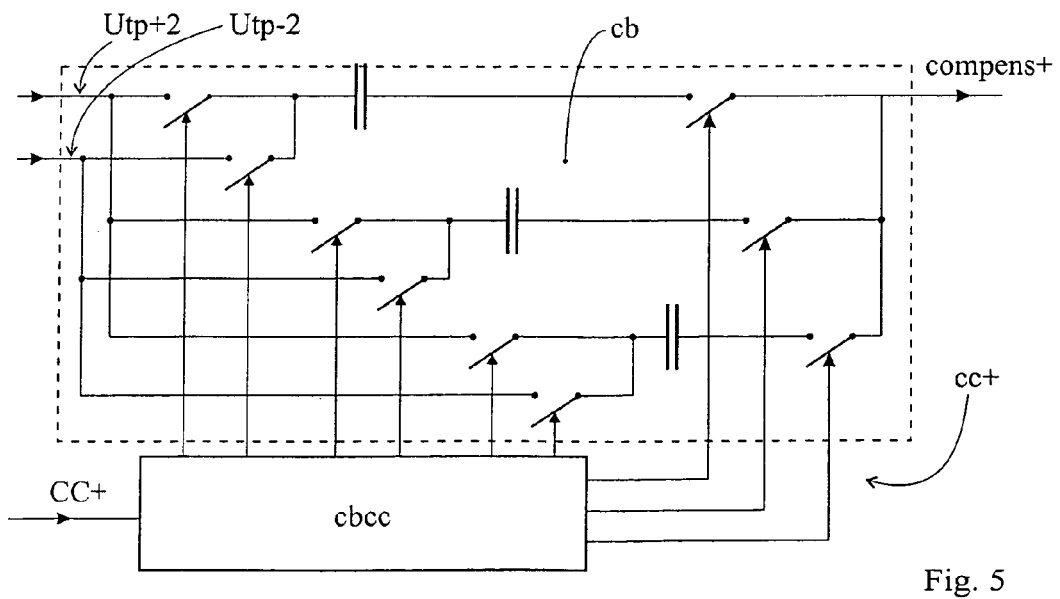

The invention will now be explained in more detail by way of disclosure of embodiments of an improved isolating interface of the invention with a differentiating circuit comprising a capacitive barrier and by way of disclosure of embodiments of an improved method for signal transmission by means of an improved isolating interface and with reference to the accompanying drawings representing in:

FIG. 4 an isolating interface of the invention with a differentiating circuit comprising a capacitive barrier for a parallel two-way symmetrical signal transmission by means of signal replicas being in mutual phase opposition, FIG. 5 a capacitive compensator to be used in the isolating interface of the invention as represented in FIG. 4, FIG. 6a an isolating interface with a differentiating circuit comprising a capacitive barrier and a communication loop provided for a one-way asymmetrical signal transmission, FIGS. 6b and 6c a communication loop provided for a one-way asymmetrical signal transmission from a first electronic circuit to a second electronic circuit through an isolating interface as represented in FIG. 6a, FIG. 7 an isolating interface of the invention with a differentiating circuit comprising a capacitive barrier for a two-way asymmetrical signal transmission.

Figure 2:
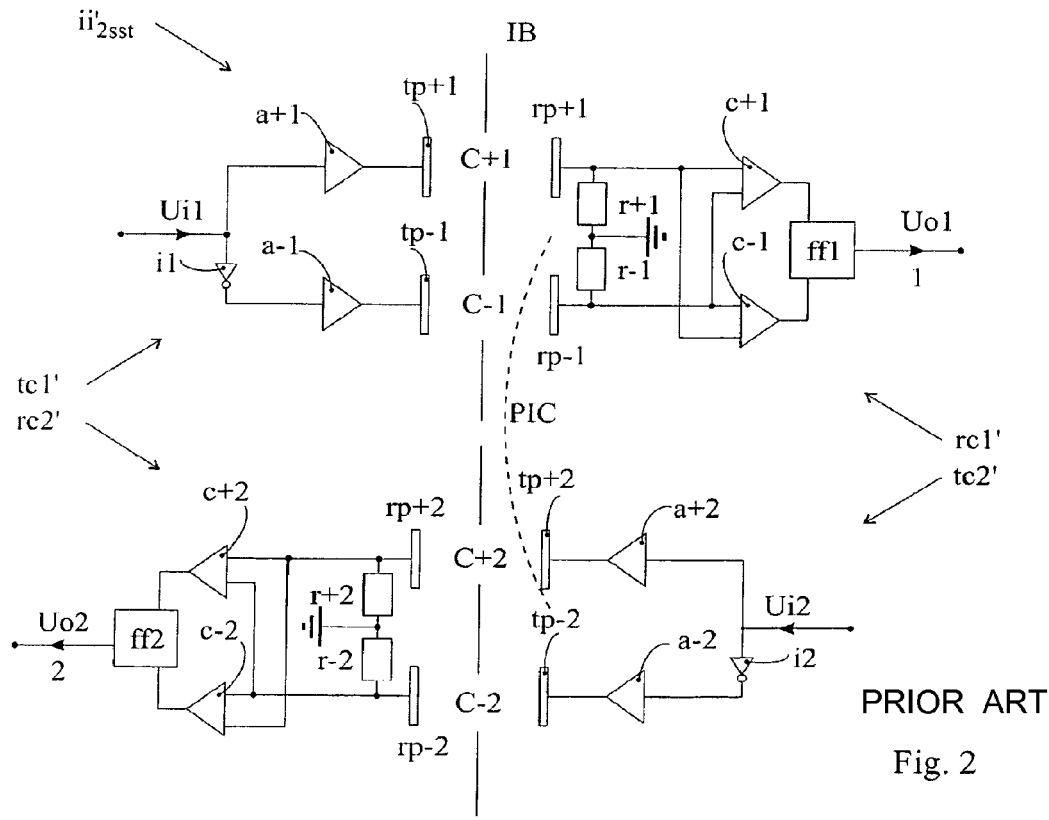

An isolating interface $ii_{2sst}$ of the invention with a differentiating circuit comprising a capacitive barrier for a parallel two-way symmetrical signal transmission by means of signal replicas being in mutual phase opposition is represented in FIG. 4 and shows only a side thereof, which is situated on the right with respect to an interface boundary IB and is an improvement of the known isolating interface represented in FIG. 2.

It comprises a first transmitting circuit and a first receiving circuit rc1 for a first communication direction 1 and a second transmitting circuit tc2 and a second receiving circuit for a second communication direction 2. The first receiving circuit rc1 is provided in either path lying symmetrically with respect to the ground potential with a first differentiating circuit r+1, C+1 and a second differentiating circuit r−1, C−1, respectively, which are assembled of a resistor r+1; r−1 and a capacitive barrier between each transmitting plate and a receiving plate rp+1; rp−1 pertaining thereto the capacitance therebetween being C+1; C−1 and with a first comparator c+1 and a second comparator c−1, which are connected to an output of the first differentiating circuit r+1, C+1 and the second differentiating circuit r−1, C−1, respectively.

The known isolating interface $ii'_{2sst}$ is further equipped according to the invention as follows.

The first receiving circuit rc1 is provided with a compensation control circuit ccc, which inputs are connected to the output of the first comparator c+1 and the output of the second comparator c−1, respectively.

It is further provided with a controlled changeover switch s, which is controlled by the compensation control circuit ccc through a first control signal CPS so that a pilot signal PS is conducted to the second transmitting circuit tc2 instead of an input signal Ui2 for communication in the second direction 2. The frequency of the pilot signal PS is of the same order of magnitude as the frequency of communication signals.

The isolating interface $ii'_{2sst}$ is further provided with a first and a second controlled grounding switch s+1, s−1, which are controlled by the compensation control circuit ccc through a second control signal C+ and a third control signal C−, respectively, to close themselves and to ground the first receiving plate rp+1 and the second receiving plate rp−1, respectively, of the first receiving circuit rc1.

The isolating interface $ii'_{2sst}$ is further provided with a first and second capacitance compensator cc+, cc−, which are controlled by the compensation control circuit ccc through a fourth control signal CC+ and a fifth control signal CC−, respectively, in such a way that a first transmitting plate tp+2 and a second transmitting plate tp−2 of the second transmitting circuit tc2 are capacitively connected to a first receiving plate rp+1 of the first receiving circuit rc1 through a connection Utp+2 and Utp−2, respectively, through the first capacitance compensator cc+ and a connection compens+ after the first capacitance compensator cc+ have begun to receive the fourth control signal CC+, and/or the first transmitting plate tp+2 and the second transmitting plate tp−2 of the second transmitting circuit tc2 are capacitively connected to the second receiving plate rp−1 of the first receiving circuit rc1 through a connection Utp+2 and Utp−2, respectively, through the second capacitance compensator cc− after the second capacitance compensator cc− has started to receive the fifth control signal CC−.

The compensation control circuit ccc is designed in a way to stop communication in the first direction 1 whenever said communication restarted, to transmit the first control signal CPS, to close a controlled changeover switch s and to conduct the pilot signal PS to the second transmitting circuit tc2.

The compensation control circuit ccc then transmits the third control signal C− and/or the second control signal C+ to set the first capacitance compensator cc+ and/or the second capacitance compensator cc−, respectively, so that the amplitude value of that part of a signal U+1 at the output of the first comparator c+1 and/or of that part of a signal U−1 at the output of the second comparator c−1, which originates or originate from the pilot signal PS due to the coupling of the first receiving circuit rc1 with the second transmitting circuit tc2, lies below a predetermined value.

The compensation control circuit ccc then freezes such setting of the first capacitance compensator cc+ and/or the second capacitance compensator cc− and stops transmitting the pilot signal PS, the first control signal CPS and the third control signal C− and/or the second control signal C+ to return the pertaining switches into the original position and to further allow the communication in the first direction 1.

Whenever communication in the first direction 1 restarted and was stopped thereafter the compensation control circuit ccc, by means of a sixth and/or a seventh control signal TC+, TC−, advantageously decreases the threshold of the first comparator c+1 and/or that of the second comparator c−1, respectively, and increases said threshold to the original level after the first capacitance compensator cc+ and/or the second capacitance compensator cc− has been set.

The capacitance compensator cc+ can be layed out as schematically shown in FIG. 5. It is made of a capacitive block cb, into which the connections Utp+2 and Utp−2 of the first transmitting plate tp+2 and the second transmitting plate tp−2, respectively, of the second transmitting circuit tc2 are conducted and from which the connection compens+ to the receiving plate rp+1 of the receiving circuit rc1 is conducted. A control circuit cbcc provided to set the capacitive block cb controls switches connecting individual capacitors within the block into the connection of the transmitting plates p+2, tp−2 to the receiving plate rp+1 as well determines the compensation control circuit ccc by means of the signal CC+.

A known method for the parallel two-way symmetrical signal transmission by means of the isolating interface with the differentiating circuit comprising a capacitive barrier as represented in FIG. 2 comprises:
- a generation of two replicas being in mutual phase opposition of the input signal for the communication in either direction
- a differentiation of the signal replicas transmitted through the capacitive barrier in the first and second differentiating circuit whereat said differentiating circuits comprise the capacitive barriers between two pairs of the interface plates for the transmission in the selected direction as in one of both possible communication directions and the time constants of said differentiating circuits are smaller than the rise time and the fall time of the signal replicas,
- a generation of the first output signal replica by comparing the signal of the first time derivative to that of the second time derivative and
- a generation of the second output signal replica by comparing the signal of the second time derivative to that of the first time derivative and
- a generation of a signal transmitted in said direction as an output signal of a flip-flop, to which inputs said output signal replicas are conducted.

The described known method for the parallel two-way symmetrical signal transmission by means of the isolating interface with the differentiating circuit comprising a capacitive barrier is further developed according to the invention as follows.

Whenever communication in the selected direction as in one of both possible communication directions has restarted after a longer time interval communication is stopped and a pilot signal instead of the input signal for communication in the selected direction is conducted to the input of the isolating interface for the reverse transmission direction.

Threshold levels for both comparations of the signals of the first and the second time derivative are decreased and the capacitances of the capacitive compensators, through which the transmitting plates for communication in the reverse direction are connected to the one or other receiving plate for communication in the selected direction, are set in a way that the amplitude of the output signal of the flip-flop, to which inputs said output signal replicas are conducted, lies below a predetermined value.

Communication in the selected direction is reestablished. Signal transmission now takes place through the isolating interface, in which the transmitting plates for communication in the reverse direction are connected to the receiving plates for communication in the selected direction through the capacitive compensators having the capacitance adjusted as described above.

An isolating interface $ii_{1ast}$ with a differentiating circuit comprising a capacitive barrier (SI 200300001) for a one-way asymmetrical signal transmission is represented in FIG. 6a. An asymmetrical forward path for of the signal through the isolating interface $ii_{1ast}$ and a reverse path ret of the signal through capacitive connections are represented, which are parts of a loop provided for the one-way signal transmission from a first electronic circuit ee1 to a second electronic circuit ec2 through the isolating interface $ii_{1ast}$. Such communication loop can operate in extremely difficult situations when a thick layer of an electrically well conductive liquid appears between the plates of the isolating interface.

The isolating interface $ii_{1ast}$ for a one-way asymmetrical signal transmission comprises an amplifier a and a transmitting plate tp connected to the output of the amplifier a in a transmitting circuit and, in a receiving circuit, a differentiating circuit, which consists of a resistor r and a capacitance C of the capacitive barrier between the transmitting plate tp and a receiving plate rp, and a comparator c, which is connected with its first input to the differentiating circuit and of which a second input is connected to the ground. An output signal of the comparator c is an output signal of the isolating interface $ii_{1ast}$.

The communication loop provided for the one-way asymmetrical signal transmission from the first electronic circuit ec1 to the second electronic circuit ec2 through the isolating interface $ii_{1ast}$ is made of a forward directed path, in which the first electronic circuit ec1 is connected to the second electronic circuit ec2 through the isolating interface $ii_{1ast}$ of the invention for the one-way signal transmission, and of a reversely directed path ret, in which the second electronic circuit ec2 is connected to the first electronic circuit ec1 in a manner that the ground g2 of the second electronic circuit ec2 is capacitivelly connected to the ground g1 of the first electronic circuit ec1. Said capacitive connection can be carried out by means of connecting capacitors Cg1cg and Cg2cg to the common ground cg (FIG. 6a). Two variants of the capacitive connection in the reversely directed path ret are shown in FIGS. 6a and 6b.

A method for the one-way asymmetrical signal transmission in the represented loop through the isolating interface is comprised of the following steps:
- a signal transmitted in the forward direction through the capacitive barrier of the isolating interface is differentiated in the differentiating circuit, which comprises the capacitive barrier between the plates of the isolating interface and of which the time constant is smaller than the rise time and the fall time of the signal,
- an output signal of the isolating interface is generated in that the signal of said time derivative is compared to the ground potential and
- the signal is transmitted in the backward direction from the second electronic circuit to the first electronic circuit through the ground of the second electronic circuit and the ground of the first electronic circuit, said grounds being capacitivelly interconnected.

An isolating interface $ii_{2ast}$ of the invention with a differentiating circuit comprising a capacitive barrier for a parallel two-way asymmetrical signal transmission is represented in FIG. 7 with only its right side with respect to the interface boundary IB. The isolating interface $ii_{2ast}$ comprises a first transmitting circuit and a first receiving circuit arc1 for a first communication direction 1 as well a second transmitting circuit atc2 and a second receiving circuit for a second communication direction 2.

The first receiving circuit arc1 is provided with a differentiating circuit r1, C1, which consists of a resistor r1 and the capacitive barrier between the transmitting plate and the receiving plate rp1 pertinent thereto, said plates having a mutual capacitance C1, and with a comparator c1, which is connected to the differentiating circuit r1, C1 and of which a second input is connected to the ground.

The first receiving circuit arc1 is also provided with a compensation control circuit accc, which is connected to an output of the comparator c1, a controlled changeover switch s, which is controlled by the compensation control circuit accc through a first control signal CPS, so that a pilot signal PS instead of an input signal Ui2 for the communication in the second direction 2 is conducted to the second transmitting circuit atc2, and with a capacitive compensator acc. The frequency of the pilot signal PS is of the same order of magnitude as the frequency of the communication signals.

The compensation control circuit accc controls a capacitive compensator acc through a second control signal CC so that the transmitting plate tp2 of the second transmitting circuit atc2 is capacitively connected to a receiving plate rp1 of the first receiving circuit arc1 through an inverter i2, a connection Utp2 and the capacitive compensator acc after the capacitive compensator acc has started to receive the second control signal CC.

The compensation control circuit accc transmits the first control signal CPS whenever communication in the first direction 1 has restarted and transmits the pilot signal PS and sets the capacitive compensator acc so that a value of the amplitude of that part of a signal Uo1 originating from the pilot signal PS at the output of the comparator c1 lies below the predetermined value. The compensation control circuit accc then freezes such setting of the capacitive compensator acc and stops transmitting the first control signal CPS as well the pilot signal PS and reestablishes communication in the first direction 1, which communication was interrupted for a short time.

Whenever communication in the first direction 1 was reestablished and stopped thereafter the compensation control circuit accc in the isolating interface $ii_{2ast}$ of the invention advantageously decreases the threshold of the comparator c1 by means of a third control signal TC and increases said threshold to the original level after the capacitive compensator acc has been set.

A communication loop of the invention provided for the parallel two-way asymmetrical signal transmission between electronic circuits ec1 and ec2 through the isolating interface $ii_{2ast}$ consists of two parts. On the one hand, a signal input and a signal output of the first electronic circuit eel and a signal input and a signal output of the second electronic circuit ec2 are connected through the isolating interface $ii_{2ast}$ for the parallel two-way signal transmission, and, on the other hand, a ground g1 of the first electronic circuit ec1 is capacitively connected to a ground g2 of the second electronic circuit ec2 in a way as represented for the one-way asymmetrical signal transmission in FIGS. 6a, 6b and 6c. The capacitance of the interconnection of said grounds g1, g2 of the communicating electronic circuits ec1, ec2 must be at least three times larger than the capacitance between the transmitting plate and the receiving plate of the isolating interface $ii_{2ast}$ for either communication direction. If the capacitance of the interconnection of said grounds g1, g2 were lower a variation of the potential of the transmitting plate would cause a considerable potential difference between the electronic circuits ec1 and ec2, which would be reflected as a parasitic input signal on the receiving plate.

A method of the invention for the parallel two-way asymmetrical signal transmission in the presented loop through the isolating interface $ii_{2ast}$ consists of the following steps:
- whenever communication in the selected direction being one of both possible communication directions restarted, the communication is stopped,
- the pilot signal instead of the input signal for communication in this direction is conducted to the input of the isolating interface for the reverse transmission direction,
- in the circuit for the selected communication direction, the threshold level for the comparison of the signal from the output of the differentiating circuit to the ground potential is decreased,
- the capacitance of the capacitive compensator is set, through which and through an invertor there is connected the transmitting plate for the communication in the reverse direction to the receiving plate for the selected communication direction in a way
- that the amplitude of the output signal for the communication in the selected direction lies below the predetermined value,
- the signal transmission in the selected direction then takes place through the isolating interface, in which the transmitting plate for communication in the reverse direction is connected to the receiving plate for communication in the selected direction through the capacitive compensator, of which the capacitance was adjusted in said way,
- the signal for the communication in the selected direction is transmitted through the capacitive barrier of the isolating interface,
- the signal is differentiated in the first differentiating circuit, which comprises said capacitive barrier between the transmitting plate and receiving plate for communication in the selected direction within the isolating interface and of which the time constant is smaller than the rise time and the fall time of the signal, the output signal of the isolating interface for the communication in the selected direction is generated in that the signal from the output of the differentiating circuit is compared to the ground potential and the signal for communication in the selected direction is transmitted through the reverse path from the second electronic circuit to the first electronic circuit through the capacitively interconnected ground of the second electronic circuit and ground of the first electronic circuit.

What is claimed is:

1. Isolating interface ($ii_{2sst}$) with a differentiating circuit comprising a capacitive barrier for a parallel two-way symmetrical signal transmission by means of signal replicas being in mutual phase opposition, said isolating interface ($ii_{2sst}$) comprising a first transmitting circuit and a first receiving circuit (rc1) for a first communication direction (1) and a second transmitting circuit (tc2) and a second receiving circuit for a second communication direction (2)

the first receiving circuit (rc1) being provided in either path lying symmetrically with respect to the ground potential with a first differentiating circuit (r+1, C+1) and a second differentiating circuit (r−1, C−1), respectively, which are made up of a resistor (r+1; r−1) and a capacitive barrier between each transmitting plate and a receiving plate (rp+1; rp−1) belonging thereto the capacitance therebetween being (C+1; C−1) and a first comparator (c+1) and a second comparator (c−1) being connected to the first differentiating circuit (r+1, C+1) and the second differentiating circuit (r−1, C−1), respectively, characterized in that the first receiving circuit (rc1) is provided with a compensation control circuit (ccc), which is connected to the output of the first comparator (c+1) and the output of the second comparator (c−1), a controlled changeover switch (s) being controlled by the compensation control circuit (ccc) through a first control signal (CPS)

to conduct a pilot signal (PS) instead of an input signal (Ui2) for the communication in the second direction (2) into the second transmitting circuit (tc2), a first and second controlled grounding switch (s+1, s−1) being controlled by the compensation control circuit (ccc) through a second control signal (C+) and a third control signal (C−), respectively, to close and to ground the first receiving plate (rp+1) and the second receiving plate (rp−1), respectively, of the first receiving circuit (rc1), a first and a second capacitance compensator (cc+, cc−) being controlled by the compensation control circuit (ccc) through a fourth control signal (CC+) and a fifth control signal (CC−), respectively, to capacitively connect a first transmitting plate (tp+2) and a second transmitting plate (tp−2) of the second transmitting circuit (tc2) to the first receiving plate (rp+1) of the first receiving circuit (rc1) through the first capacitance compensator (cc+)

after the first capacitance compensator has started to receive the fourth control signal (CC+), and/or to capacitively connect the first transmitting plate (tp+2) and the second transmitting plate (tp−2) of the second transmitting circuit (tc2) to the second receiving plate (rp−1) of the first receiving circuit (rc1) through the second capacitance compensator (cc−)

after the second capacitance compensator (cc−) has started to receive the fifth control signal (CC−)

and that the compensation control circuit (ccc) stops communication in the first direction (1)

whenever said communication restarted, transmits the first control signal (CPS) and transmits the pilot signal (PS) and transmits the third control signal (C−) and/or the second control signal (C+) and sets the first capacitance compensator (cc+) and/or the second capacitance compensator (cc−)

so that an amplitude value of that part of signal (U+1) at the output of the first comparator (c+1) and/or of that part of signal (U−1) at the output of the second comparator (c−1), which originates or originate from the pilot signal (PS) lies below the predetermined value, freezes such setting of the first capacitance compensator (cc+) and/or the second capacitance compensator (cc−), stops transmitting the first control signal (CPS), the third control signal (C−) and/or the second control signal (C+) and the pilot signal (PS) and restarts communication in the first direction (1).

2. Isolating interface ($ii_{2sst}$) with the differentiating circuit comprising the capacitive barrier for the parallel two-way symmetrical signal transmission as recited in claim 1, characterized in that whenever communication in the first direction (1) restarted and thereafter stopped the compensation control circuit (ccc) decreases the threshold of the first comparator (c+1) and/or of the second comparator (c−1) by means of a sixth and/or seventh control signal (TC+, TC−) and increases said threshold to the original level after the setting of the first capacitance compensator (cc+) and/or the second capacitance compensator (cc−) has been carried out.

3. Isolating interface ($ii_{2sst}$) with the differentiating circuit comprising the capacitive barrier for the parallel two-way symmetrical signal transmission as recited in claim 1, characterized in that the frequency of the pilot signal (PS) is of the same order of magnitude as the frequency of communication signals.

4. Method for the parallel two-way symmetrical signal transmission by means of the isolating interface with the differentiating circuit comprising a capacitive barrier as recited in any of claims 1, according to which method two replicas being in mutual phase opposition of the input signal for the communication in either direction are generated for this direction of the signal transmission, the signal replicas transmitted through the capacitive barrier are differentiated in the first and second differentiating circuit, respectively, which comprise the capacitive barriers between two pairs of the interface plates for the transmission in the selected direction as in one of both possible communication directions and of which time constants are smaller than the rise time and the fall time of the signal replicas, the first output signal replica is generated in that the signal of the first time derivative is compared to that of the second time derivative and the second output signal replica is generated in that the signal of the second time derivative is compared to that of the first time derivative
and a signal transmitted by the isolating interface in said direction is generated as an output signal of a flip-flop, to which inputs said output signal replicas are conducted, characterized in
that, whenever communication in the selected direction as in one of both possible communication directions restarted, communication is stopped and
the pilot signal instead of the input signal for communication in the selected direction is conducted to an input of the isolating interface for the reverse transmission direction,
that the threshold levels for both comparisons of the signals of the first and the second time derivative are decreased
that the capacitance of the first capacitive compensator is set, through which the transmitting plates for communication in the reverse direction are connected to the receiving plates for communication in the selected direction in a way
that the amplitude of the output signal of the flip-flop, to which inputs said output signal replicas are conducted, lies below a predetermined value,
and that communication in the selected direction is reestablished and
the signal transmission then takes place through the isolating interface,
in which the transmitting plates for communication in the reverse direction are connected to the transmitting plates for communication in the selected direction through the capacitive compensator with the adjustable capacitance.

5. Isolating interface ($ii_{2ast}$) with a differentiating circuit comprising a capacitive barrier for a parallel two-way asymmetric signal transmission comprising
a first transmitting circuit and a first receiving circuit (arc1) for a first communication direction (1) and
a second transmitting circuit (atc2) and a second receiving circuit for a second communication direction (2), characterized in
that the first receiving circuit (arc1) is provided with
a differentiating circuit (r1, C1),
which consists of a resistor (r1) and
the capacitive barrier between the transmitting plate and the receiving plate (rp1) pertinent thereto said plates having a mutual capacitance (C1), and
a comparator (c1),
which is connected to the differentiating circuit (r1, C1) and of which a second input is connected to the ground,
a compensation control circuit (accc),
which is connected to an output of the comparator (c1),
a controlled changeover switch (s),
which is controlled by the compensation control circuit (accc) through a first control signal (CPS)
to conduct a pilot signal (PS) instead of an input signal (Ui2) for the communication in the second direction (2) to the second transmitting circuit (atc2),
a capacitive compensator (acc),
which is controlled by the compensation control circuit (accc) through a second control signal (CC)
to capacitively connect the transmitting plate (tp2) of the second transmitting circuit (atc2) to a receiving plate (rp1) of the first receiving circuit (arc1) through an inverter (i1) and the capacitive compensator (acc)
after the capacitive compensator (acc) has started to receive the second control signal (CC),
and that compensation control circuit (accc)
whenever communication in the first direction (1) restarted transmits the first control signal (CPS) and
transmits the pilot signal (PS) and
sets the capacitive compensator (acc)
so that a value of the amplitude of that part of signal (Uo1) originating from the pilot signal (PS) at the output of the comparator (c1) lies below the predetermined value,
freezes such setting of the capacitive compensator (acc), stops transmitting the first control signal (CPS) as well the pilot signal (PS) and
reestablishes communication in the first direction (1).

6. Isolating interface ($ii_{2ast}$) with the differentiating circuit comprising the capacitive barrier for the parallel two-way asymmetric signal transmission as recited in claim 5, characterized in
that, whenever communication in the first direction (1) is reestablished and thereafter stopped,
the compensation control circuit (accc) decreases the threshold of the comparator (c1) through a third control signal (TC) and increases said threshold to the original level
after the capacitive compensator (acc) has been set.

7. Isolating interface ($ii_{2ast}$) with the differentiating circuit comprising the capacitive barrier for the parallel two-way asymmetric signal transmission as recited in claim 5, characterized in
that the frequency of the pilot signal (PS) is of the same order of magnitude as the frequency of the communication signals.

8. Loop provided for the parallel two-way asymmetric signal transmission between electronic circuits (ec1, ec2) through the isolating interface ($ii_{2ast}$) as recited claim 5, characterized in
that the signal input and the signal output of the first electronic circuit (ec1) and the signal input and the signal output of the second electronic circuit (ec2) are connected through the isolating interface ($ii_{2ast}$) for the parallel two-way signal transmission
and that a ground (g1) of the first electronic circuit (ec1) is capacitively connected to a ground (g2) of the second electronic circuit (ec2).

9. Loop provided for the parallel two-way asymmetric signal transmission between the electronic circuits (ec1, ec2) through the isolating interface ($ii_{2ast}$) as recited in claim 8, characterized in
that the capacitance of the interconnection of said grounds (g1, g2) of the communicating electronic circuits (ec1, ec2) is at least three times larger than the capacitance between the transmitting plate and the receiving plate of the isolating interface ($ii_{2ast}$) for either communication direction.

10. Method for the parallel two-way asymmetrical signal transmission through the loop as recited in claim 8 between the first electronic circuit and the second electronic circuit, characterized in
that whenever communication in the selected direction being one of both possible communication directions restarted, communication is stopped and
the pilot signal instead of an input signal for communication in this direction is conducted to the input of the isolating interface for the reverse transmission direction,
that, in the circuit for the selected communication direction, the threshold level for the comparison of the signal from the output of the diferentiating circuit to the ground potential is decreased,
that the capacitance of the capacitive compensator is set, through which and through an invertor the transmitting plate for communication in the reverse direction is connected to the receiving plate for the selected communication direction in a way that the amplitude of the output signal for communication in the selected direction lies below the predetermined value, that the signal transmission in the selected direction then takes place through the isolating interface, in which the transmitting plate for communication in the reverse direction is connected to the receiving plate for communication in the selected direction through the capacitive compensator, of which the capacitance has been adjusted in said way, that the signal for communication in the selected direction is transmitted through the capacitive barrier of the isolating interface, that the signal is differentiated in the first differentiating circuit, which comprises said capacitive barrier between the transmitting plate and receiving plate for communication in the selected direction in the isolating interface and of which the time constant is smaller than the rise time and the fall time of the signal, that the output signal of the isolating interface for communication in the selected direction is generated in that the signal from the output of the differentiating circuit is compared to the ground potential, and that the signal for communication in the selected direction is transmitted through the reverse path from the second electronic circuit to the first electronic circuit through the capacitively interconnected ground of the second electronic circuit and ground of the first electronic circuit the capacitance of the interconnection of the grounds of the communicating electronic circuits being at least three times larger than the capacitance between the transmitting plate and the receiving plate of the isolating interface for either communication direction.

* * * * *